(12) United States Patent
Kovac

(10) Patent No.: US 7,066,701 B2
(45) Date of Patent: Jun. 27, 2006

(54) FASTENER FOR VARIOUSLY SIZED STUDS

(75) Inventor: Zdravko Kovac, Chesterfield, MI (US)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/347,753

(22) Filed: Jan. 21, 2003

(65) Prior Publication Data

US 2003/0147720 A1 Aug. 7, 2003

Related U.S. Application Data

(60) Provisional application No. 60/355,590, filed on Feb. 7, 2002.

(51) Int. Cl.
*F16B 37/08* (2006.01)

(52) U.S. Cl. .................. 411/433; 411/437; 411/512

(58) Field of Classification Search ................ 411/182, 411/433, 437, 512
See application file for complete search history.

(56) References Cited

U.S. PATENT DOCUMENTS

| | | | | |
|---|---|---|---|---|
| 2,364,668 A | * | 12/1944 | Simmons ................... 411/437 |
| 3,572,751 A | * | 3/1971 | Burr et al. ................... 280/750 |
| 4,671,717 A | * | 6/1987 | Fukuhara ..................... 411/182 |
| 5,302,070 A | * | 4/1994 | Kameyama et al. ........ 411/437 |
| 5,551,817 A | * | 9/1996 | Kanie ......................... 411/107 |
| 5,816,762 A | * | 10/1998 | Miura et al. ................. 411/433 |
| 5,833,480 A | | 11/1998 | Austin |
| 5,941,670 A | * | 8/1999 | Sano et al. .................. 411/433 |
| 5,987,714 A | | 11/1999 | Smith |
| 6,049,952 A | | 4/2000 | Mihelich et al. |
| 6,561,741 B1 | * | 5/2003 | Garver ........................ 411/386 |

\* cited by examiner

*Primary Examiner*—Flemming Saether
(74) *Attorney, Agent, or Firm*—Harness, Dickey & Pierce, P.L.C.

(57) ABSTRACT

The disclosed fastener includes a body having a cavity therein and a wall at least partially surrounding said cavity. The fastener additionally includes a finger having a first member extending from the wall. The first member is attached to a second member having at least one engagement mechanism on its distal end adapted to cooperate with a second engagement mechanism on the stud to retain the fastener on the stud. The first member extends outwardly from the wall and the second member extends inwardly into the cavity. A plurality of fingers each include a lower surface angled upwardly toward the center of the cavity such that a stud contacting the lower surface will be moved toward the center of the cavity.

15 Claims, 2 Drawing Sheets

FASTENER FOR VARIOUSLY SIZED STUDS

CROSS-REFERENCE TO RELATED APPLICATIONS

This application claims the benefit of U.S. Provisional Application No. 60/355,590, filed on Feb. 7, 2002. The disclosure of the above application is incorporated herein by reference.

FIELD OF THE INVENTION

The present invention relates to fasteners for attachment to studs; and more particularly, to such fasteners which are push-on fasteners.

BACKGROUND OF THE INVENTION

Studs are used, for example, in the automotive manufacturing industry to enable the attachment of various components via fasteners. The studs may be attached by, e.g., projection welding or using self piercing studs as known in the art. Fasteners are then attached to the studs to which various components may be attached. For example, cables, wires, or bundles can be attached or fluid handling tubes (including, e.g., brake fluid, fuel, air) can be attached to the studs via the fasteners to maintain appropriate routing of these elements.

The studs utilized are often of various sizes and/or configurations (for example, thread types). This causes the manufacturer to have to stock a multitude of fasteners of various sizes. The costs associates with managing the inventories of multiple fasteners and the increased inventories themselves is far greater than it would be if one fastener could be utilized for the various studs. Consequently, there is a need to provide a fastener which can attach to studs of various sizes and/or configurations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

SUMMARY OF THE INVENTION

In accordance with one aspect of the present invention a fastener useful for attachment to a variety of studs is provided. The fastener includes a body having a cavity therein and a wall at least partially surrounding said cavity. The fastener additionally includes a finger having a first member extending from the wall. The first member is attached to a second member having at least one engagement mechanism on its distal end adapted to cooperate with a second engagement mechanism on the stud to retain the fastener on the stud.

In another aspect of the present invention the first member extends outwardly from the wall and the second member extends inwardly into the cavity. In an additional aspect of the present invention a plurality of fingers is included. Each of the fingers has a lower surface angled upwardly toward the center of the cavity such that a stud contacting the lower surface will be moved toward the center of the cavity.

In yet another aspect of the present invention the engagement member includes a plurality of axially disposed, elongated teeth adapted to cooperate with threads to retain the fastener on a stud member. The finger is adapted to move laterally outwardly upon insertion of the stud into the cavity and exert a force on a stud while maintaining all of the axially disposed teeth in engagement orientation with the stud threads. In an additional aspect of the present invention the engagement member extends laterally at least 20 percent of the cavity dimension.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses. For example, although the present invention is discussed throughout as a fastener which is used for attachment to a stud 10 of an automobile having a head 12 and a threaded member 14 as seen, for example, in FIG. 1a, the fastener is not so limited and may be used in many other contexts.

Figure 1:
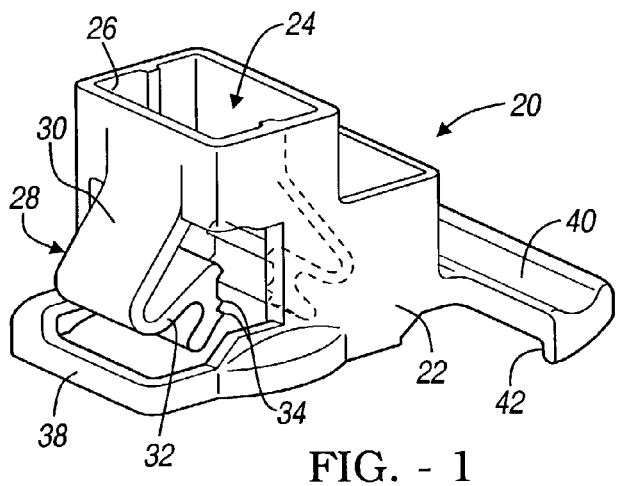
FIG. 1 is a perspective view of a preferred embodiment of a fastener of the present invention.
Figure 1A:
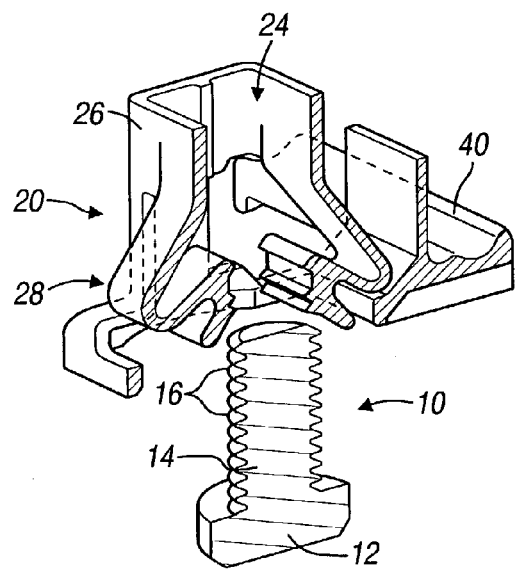
FIG. 1a is a perspective, cross-sectional view taken through the center of the fastener of FIG. 1 and including a stud.

Referring to FIG. 1, a preferred embodiment of a fastener useful for attachment to a variety of studs according to the present invention is generally indicated as 20. The fastener 20 is generally comprised of a housing 22 or body. The housing 22 is preferably made of a thermoplastic material. Preferred examples include, nylon, acetal, hytrel, and polypropelene.

A cavity 24 is located in the housing 22. The cavity 24 is surrounded by a wall 26 having a generally square cross-section. The dimensions of the cavity 24 are sufficient to accommodate a variety of threaded studs 10. For example, the cavity 24 is dimensioned to handle studs 10 having threaded members 14 with up to an eight millimeter diameter. Similarly, the cavity 24 can readily accommodate studs 10 having threaded members 14 with a five millimeter diameter. Of course, any variation of sizes, e.g., of four millimeter difference as in this example, may be accommodated.

Figure 2:
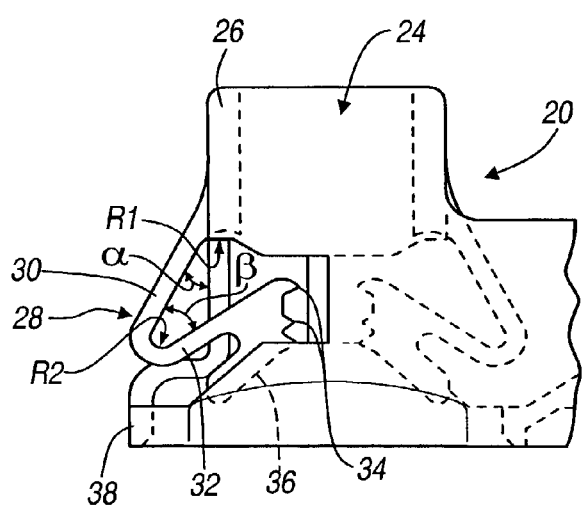
FIG. 2 is a partial elevation view of the fastener of FIG. 1.

Referring to FIG. 2, two opposing fingers 28 extend outwardly from the wall 26. A first member 30 of each finger 28 is cantilevered from the wall 26 at an initial angle α of about 26 degrees. The initial angle α, between the longitudinal axis of the cavity 24 and each first member 30 is preferably from about 10 degrees to about 40 degrees; and more preferably, from about 20 degrees to about 30 degrees. The lower surface of the first member 30 is joined to the wall 26 using a radius R1 of about 1.2 millimeters. The radius R1 is preferably from about 0.8 millimeters to about 2 millimeters. The first member 30 has a thickness of about 1.3 millimeters. The thickness of the first member 30 is preferably from about 0.5 millimeters to about 2.5 millimeters; and more preferably, from about 0.8 millimeters to about 1.8 millimeters.

A second member 32 of each finger 28 is integrally connected to the distal end of first member 30 at an initial angle β of about 29 degrees. Preferably, this initial angle β is from about 20 degrees to about 40 degrees; and more preferably, from about 25 degrees to about 35 degrees. Accordingly, combining the preferred ranges of the initial angle α and the initial angle β, the second member preferably extends at an angle between about 30 degrees and about 80 degrees with respect to the longitudinal axis of the cavity. The radius R2 between the two members 30, 32 is about 0.6 millimeters. Preferably, this radius R2 is from about 0.3 millimeters to about 3 millimeters; and more preferably, from about 0.4 millimeters to about 2 millimeters. The thickness of the second member 32 in the area near where it connects to the first member 30 is the same as mentioned above with respect to the first member 30.

The second member 32 has a plurality of engagement projections 34 at its distal end which are adapted to cooperate with the threads 16 on a stud 10. Alternatively, one tooth 34 may be utilized. Thus, the projections 34 operate as first engagement members and the threads 16 operate as second engagement members. The threads 16 on the stud 10 may be, for example, metric threads with 1 millimeter pitch or threads with 1.6 millimeter pitch. The engagement projections 34 are illustrated as three horizontally elongated teeth. The engagement projections 34 preferably extend at least about 20 percent of the cavity 24 width; more preferably, at least about 50 percent and even more preferably at least about 75 percent.

Each elongated tooth 34 has a profile which preferably mates with the shape between the stud threads 16. The teeth 34 are axially graduated so that the middle tooth is above the lower tooth at a distance which is about one-third of the total distance between the upper and lower teeth. This total distance is preferably from about 2 millimeters to about 4 millimeters; and more preferably, about 3 millimeters. The middle tooth is also set back slightly; preferably about 1 millimeter. The teeth 34 on one of the fingers 28 is optionally offset about one-half of the thread 16 pitch distance which helps insure positive locking at virtually any position. Preferably, this offset is from about 0.5 millimeters to about 0.8 millimeters.

The lowest surface 36 of each second member 32 is generally angled toward the center of the cavity 24. The angle from horizontal of these lowest surfaces is about 44 degrees. Preferably, this angle is from about 30 degrees to about 60 degrees; and more preferably, from about 40 degrees to about 50 degrees. The angle is such that these lower surfaces 36 operate to provide a centering function as a stud 10 is inserted into the cavity 24. As a result of centering the stud 10 during insertion, the forces which are exerted on each finger 28 is equalized. Consequently, the movement of each finger 28 is minimized, and thus, the insertion force is minimized. Also, the angle from horizontal of the lower surface of the bottom tooth is preferably at least about 30 degrees.

Figure 3:
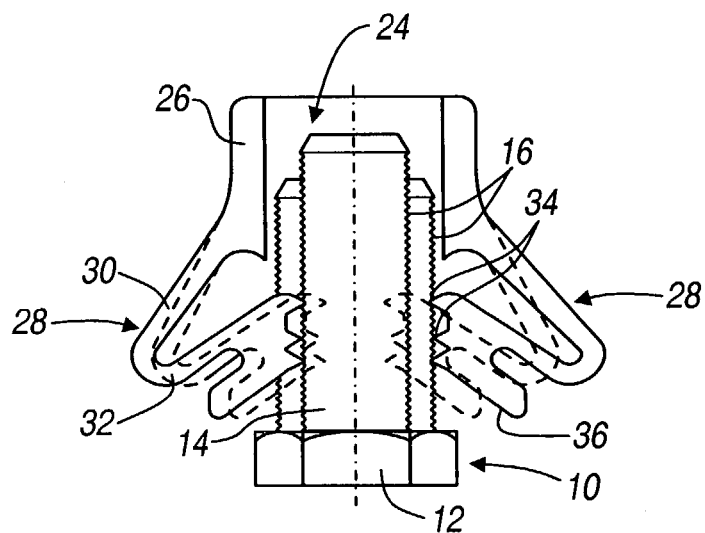
FIG. 3 is an illustration of the various positions of the fingers extending from the wall of the fastener of FIG. 1.

Referring to FIG. 3, the dotted lines show the initial position of the fingers 28, prior to inserting a stud 10 into the cavity 24. The left side finger 28 is illustrated in the final position when a relatively small diameter stud 10 is inserted. The right side finger 28 is illustrated in the final position when a relatively large diameter stud 10 is inserted. In either case, it can be seen that the fingers 28 are moved laterally from their initial position. This lateral movement provides a biasing, compressive force on the threaded member 14 of the inserted stud 10. Thus, the fingers 28 insure engagement of the teeth 34 with threads 16 on the stud member 14 regardless of which of the variety of stud sizes is utilized.

The distance between the distal end of the fingers 28 increases from an initial distance by about 2.2 millimeters for a relatively smaller diameter stud 10 and increases by about 5.0 millimeters for a relatively larger diameter stud 10. Preferably, this distance increases from about 1.5 millimeters to about 6.0 millimeters as a result of inserting appropriate predetermined stud members; and more preferably, between 2.0 and 5.5 millimeters. The initial clear distance between the engagement teeth 34 is about 2.9 millimeters.

As the fingers 28 move outwardly, their compound nature permits the teeth 34 to remain generally vertically aligned. Thus, the teeth 34 are maintained aligned at the correct angle with respect to the stud member 14, regardless of which size of the variety of studs 10 is inserted. This maintained vertical alignment is made possible by configuring the members 30, 32 of the finger 28 so they may flex and move relative to each other. For example, angle α changes from its initial about 26 degrees to about 33 degrees for a relatively small stud 10 and to about 46 degrees for a relatively large stud 10. Thus, like the distances above, the angle α about doubles for the large diameter stud 10 and increases by about 50 percent for a small diameter stud 10. Similarly, angle β changes from its initial about 29 degrees to about 21 degrees for a relatively small stud 10 and to about 14 degrees for a relatively large stud 10. The reduction is by about 50 percent for the large stud 10 and by about 25 percent for the small stud 10. Thus, the proportions between the various positions all remain about constant.

Returning to FIGS. 1 and 1a, the housing 22 additionally includes a base 38 surrounding a larger dimensioned portion of the cavity 24. This portion of the cavity 24 is dimensioned and shaped to accommodate the head 12 of the largest of the variously sized studs 10. The base 38 includes a lower surface which generally contacts the surface to which the stud 10 is attached, generally by welding. Alternatively, the lower surface of the base 38 may contact the stud head 12, an intermediate part, or nothing.

The housing 22 also includes a retention member 40 which can be used to retain cables, wires, bundles or fluid handling tubes. The retention member 40 of FIG. 1 is an elongated retention member 40 having a recessed groove. The wires or tubes are at least partially located within the recess. Tape is then wrapped around at least one end of the elongated retention member 40 to attach the wires or tubes and hold them in place. An extending wall 42 is located at each end of the elongated retention member 40 which operates to prevent the tape from pulling of the ends.

Figure 4:
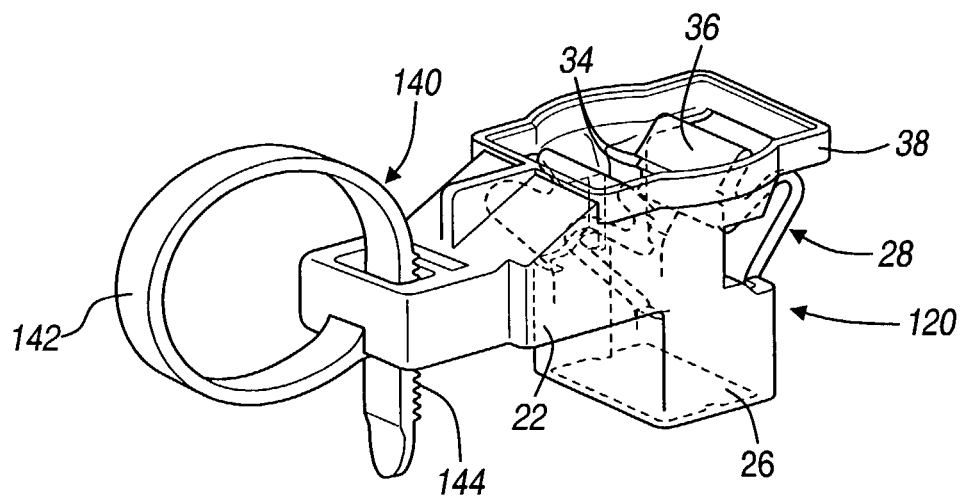
FIG. 4 is a perspective view of an alternative preferred embodiment of a fastener of the present invention.

Referring to FIG. 4, an alternative retention member 140 is illustrated. This retention member 140 is essentially a standard adjustably locking plastic band 142 commonly used for binding wire attached to the housing 22. The band 142 includes a series of serrated edges 144 which enable the band 142 to be inserted through an opening in the housing 22 in one direction but which interact with a projection (not seen) which locks against the serrated edges 144 to prevent the band 142 from being pulled back out in the opposite direction.

Although the fasteners 20 generally remain on the stud 10 once they are fastened thereto, there may be some circumstances where it is desirable to remove a fastener 20 from a stud 10. The fastener 20 may be removed by unscrewing it from the stud 10. However, the fact that a portion of the fingers 28 are compound and/or external to the wall 26 provides additional options for removal. For example, the fingers 28 can be grasped and pulled laterally outwardly so that the teeth 34 disengage with the threads 16, thereby permitting the straight upward pulling of the fastener 20 off the stud 10. This is beneficial, since the wires or tubes do not have to be detached from the retaining member 40, 140 to facilitate removal as required to unscrew the fastener 20. An upward force can also be provided, for example, by a tool on the bottom of the second member 32 near the joinder of the first 30 and second member 32 together. This upward force will also release the engagement teeth 34 and permit removal by a single upward force.

Many other modifications may be made to the described embodiments without departing from the spirit and scope of this invention. For example, although two fingers 28 are illustrated, any number may be utilized. In an alternative where one finger 28 is utilized, the other side of the cavity 24 may be smooth or may incorporate non-moving teeth 34 on its inside surface. As another example, although engagement projections 34 which cooperate with threads 16 are illustrated, many other engagement mechanisms may be utilized. In one alternative, instead of teeth 34, engagement projections on a stud member 14 may cooperate with recesses on the fingers 28.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fastener useful for attachment to a variety of studs comprising:
    a monolithic body having an insertion end defining a cavity therein receiving one of the variety of studs inserted from the insertion end and a wall at least partially surrounding said cavity;
    the body having a finger having a first member extending outwardly from the wall in a direction towards said insertion end, a second member being attached to a distal end of the first member and extending inwardly into said cavity in a direction away from said insertion end, the second member having a first engagement mechanism formed on a distal end of the second member adapted to cooperate with a second engagement mechanism of said stud to retain the fastener on the stud, wherein the fingers are configured to be deformable to couple to one of a plurality of studs each having a varying diameter.

2. A fastener according to claim 1, wherein said second engagement mechanism are a plurality of threads of the stud and said first engagement mechanism is a projection.

3. A fastener according to claim 1, further comprising a retaining member extending from the body and being adapted to hold an object to the fastener.

4. A fastener according to claim 1, wherein said finger is a plurality of fingers.

5. A fastener according to claim 1, wherein said first engagement mechanism is a plurality of teeth.

6. A fastener useful for attachment to a variety of different studs comprising:
    a stud having a diameter between first and second diameters to engage the fastener;
    a body having an insertion end and a cavity therein receiving the stud inserted from the insertion end and a wall at least partially surrounding said cavity;
    a finger extending from said wall and having a first engagement mechanism adapted to cooperate with a second engagement mechanism of the stud to retain the body on the stud, the finger having a first member extending downwardly toward the insertion end at a first angle from said wall and a second member extending upwardly away from the insertion end from the first member at a second angle thereto such that a force is exerted on the stud to engage said cooperating engagement mechanisms, regardless of the diameter of the stud inserted into the cavity.

7. A fastener according to claim 6, wherein the first angle is from about 10 degrees to about 40 degrees.

8. A fastener according to claim 6 wherein the second angle is from about 20 degrees to about 40 degrees.

9. A fastener according to claim 6 wherein an inner surface joining the first member to the second member has a radius of from about 0.3 millimeters to about 0.9 millimeters.

10. A fastener according to claim 6 wherein a lower surface of the first member joining the wall has a radius of from about 0.8 millimeters to about 1.4 millimeters.

11. A fastener useful for attachment to a variety of threaded studs comprising:
    a monolithic body having an insertion end a cavity therein receiving one of the variety of threaded studs having varying diameters; and
    at least two fingers formed on the body and extending from the body, the at least two fingers each including a first member extending outwardly from the cavity in a direction towards said insertion end, a second member being attached to a distal end of the first member and extending inwardly into the cavity in a direction away from said insertion end, and an engagement member extending at an angle between about 30 degrees and about 60 degrees with respect to a longitudinal axis of the cavity and being adapted at a distal end to cooperate with a thread of the stud to retain the fastener on the stud, the engagement member having a lower surface angled upwardly toward a center of the cavity such that the stud contacting the lower surface will move the lower surface in a substantially lateral direction away from the center of the cavity and will move the distal end to cooperate with the thread of the stud.

12. A fastener according to claim 11 wherein the end adapted to cooperate with the threads on one of said fingers is axially offset from the end adapted to cooperate with threads on another one of said fingers.

13. A fastener according to claim 12, wherein said axial offset is equivalent to about one half of a pitch of the threads.

14. A fastener according to claim 12, further comprising a retaining member extending from the body and being adapted to hold an object to the fastener.

15. A fastener according to claim 11, further comprising a retaining member extending from the body and being adapted to hold an object to the fastener.

* * * * *